(12) United States Patent
Bédard et al.

(10) Patent No.: US 7,490,686 B2
(45) Date of Patent: Feb. 17, 2009

(54) MULTI-PASSENGER SNOWMOBILE HAVING A SEAT WITH A MOVABLE BACKREST

(75) Inventors: Yvon Bédard, Orford (CA); André Gilbert, Rock-Forest (CA)

(73) Assignee: Bombardier Recreational Products Inc., Valcourt (CA)

( * ) Notice: Subject to any disclaimer, the term of this patent is extended or adjusted under 35 U.S.C. 154(b) by 316 days.

(21) Appl. No.: 11/212,753

(22) Filed: Aug. 29, 2005

(65) Prior Publication Data

US 2006/0060403 A1 Mar. 23, 2006

Related U.S. Application Data

(63) Continuation-in-part of application No. 11/040,192, filed on Jan. 24, 2005, now abandoned, which is a continuation of application No. 10/851,473, filed on May 22, 2004, now abandoned.

(60) Provisional application No. 60/654,382, filed on Feb. 18, 2005, provisional application No. 60/472,733, filed on May 23, 2003.

(51) Int. Cl.
*B62M 27/02* (2006.01)

(52) U.S. Cl. .................................. 180/190; 297/215.12
(58) Field of Classification Search ................. 180/182, 180/190; 297/215.12
See application file for complete search history.

(56) References Cited

U.S. PATENT DOCUMENTS

| 4,779,695 A * | 10/1988 | Yasui .......................... 180/190 |
| 6,491,124 B1* | 12/2002 | Thompson et al. .......... 180/190 |
| 6,749,036 B1* | 6/2004 | Schrapp et al. ............. 180/190 |

OTHER PUBLICATIONS

Cover Page of 2001 Ski-Doo Skandic Brochure.
http://www.industriesjack.com/1enprod2a.htm.

* cited by examiner

*Primary Examiner*—Kevin Hurley
(74) *Attorney, Agent, or Firm*—Osler, Hoskin & Harcourt LLP

(57) ABSTRACT

A snowmobile positions riders close to the center of gravity of the snowmobile, reduces jostling forces, and improves the comfort and ridability of the snowmobile. The snowmobile has a straddle-type seat assembly has three seat portions that are designed to accommodate one, two, or three riders. An adjustable backrest may be positioned to provide back support in a variety of seat configurations.

18 Claims, 16 Drawing Sheets

MULTI-PASSENGER SNOWMOBILE HAVING A SEAT WITH A MOVABLE BACKREST

This application is a continuation-in-part of U.S. patent application Ser. No. 11/040,192 filed on Jan. 24, 2005, now abandoned. The '192 application was a continuation of U.S. patent application Ser. No. 10/851,476 filed on May 22, 2004, now abandoned. Through the '476 application, this application claims the benefit of priority to U.S. Patent Application No. 60/472,733 filed on May 23, 2003. This application also claims the benefit of priority to U.S. patent application Ser. No. 60/654,382, filed Feb. 18, 2005. All of the aforementioned applications are incorporated herein by reference. This application also incorporates by reference the following U.S. patent applications Ser. No. 09/877,188, filed on Jun. 11, 2001; Ser. No. 09/472,134, filed on Dec. 23, 1999; 60/167,614, filed on Nov. 26, 1999; and Canadian Patent Application No. 2,256,944, filed on Dec. 23, 1998.

BACKGROUND OF THE INVENTION

1. Field of the Invention

The present invention relates generally to the overall design and construction of a snowmobile, and more particularly to a design of a snowmobile seat which improves the riders' comfort.

2. Description of the Related Art

Conventional snowmobile backrests share a common construction: they are all attached to the frame of the snowmobile when adapted to be moveable from a first position to a second position to provide additional comfort for the rider. Some conventional backrests, which are not movable from a first position to a second position, are attached directly to the seat and thus must also be removed with the seat when the seat is removed from the snowmobile.

U.S. Pat. No. 6,491,124 shows a conventional snowmobile backrest which is attached to the frame of the snowmobile and is moveable therewith. The drawback of this conventional construction is the backrest remains attached to the frame even when a rear portion of the seat is removed to enlarge a cargo storage space behind the remaining seat. Because the backrest remains attached to the snowmobile frame, the benefits of removing a portion of the seat is reduced since the backrest occupies some of the space around the cargo storage space.

While the conventional snowmobile backrest is entirely adequate for enjoying the sport of snowmobiling, a desire has developed for a snowmobile that may comfortably accommodate two passengers in addition to the driver (3-up rider positioning). Consequently, a need has arisen for a new and improved snowmobile seat and backrest assembly.

SUMMARY OF THE INVENTION

The present invention improves upon the conventional seat design by repositioning the backrest directly onto the seat and moveable therewith to provide additional comfort for the rider. This improvement facilitates the addition and removal of a third seat for a third rider.

One aspect of the present invention is a snowmobile comprising a frame; an engine disposed on the frame; a drive track disposed below the frame and operatively connected to the engine for propulsion of the snowmobile; a straddle seat assembly attached to the frame rearward of the engine, the straddle seat comprising a first seat portion for a driver, a second seat portion for a first passenger, a backrest mounted to the seat assembly, the backrest movable between a first position and a second position; two skis disposed on the frame; and a steering device disposed on the frame forward of the seat assembly and operatively connected to the two skis for steering the snowmobile.

Yet another aspect of the present invention provides the snowmobile with a tunnel and the seat assembly is attached to the tunnel.

Still another aspect of the present invention has the backrest, when in the first position, provides support for the driver, and when in the second position, provides support for the first passenger.

Another aspect of the present invention has the backrest pivotably mounted to the seat assembly and pivots between the first position and the second position.

Still another aspect of the present invention provides the seat assembly with backrest mounting points, and the backrest is selectively releasably attachable to at least one of the backrest mounting points.

Yet another aspect of the present invention has at least one backrest mounting point associated with the first seat position and at least one backrest mounting point associated with the second seat position.

Another aspect of the present invention provides the seat assembly with a third seat portion for a second passenger.

Still another aspect of the present invention provides backrest mounting points associated with the second seat position and with the third seat position.

Yet another aspect of the present invention provides the backrest movable between a first position, a second position and a third position.

Another aspect of the present invention provides the seat assembly with a third seat portion for a second passenger, and the backrest is movable between a first position, a second position and a third position.

Still another aspect of the present invention has the backrest, when in the first position, provide support for the first driver, when in the second position, provide support for the first passenger, and when in the third position, provide support for the second passenger.

Yet another aspect of the present invention provides the first seat portion and the second seat portion separately removable from the snowmobile.

Still another aspect of the present invention provides the first seat portion, the second seat portion, and the third seat portion each separately removable from the snowmobile.

Additional and/or alternative aspects, objects, and features of embodiments of the present invention will be made more apparent in the description that follows.

BRIEF DESCRIPTION OF THE DRAWINGS

Various exemplary embodiments of the present invention will be described with reference to the following drawings, wherein like reference numbers denote like features, in which.

DESCRIPTION OF EXEMPLARY EMBODIMENTS

Figure 1:
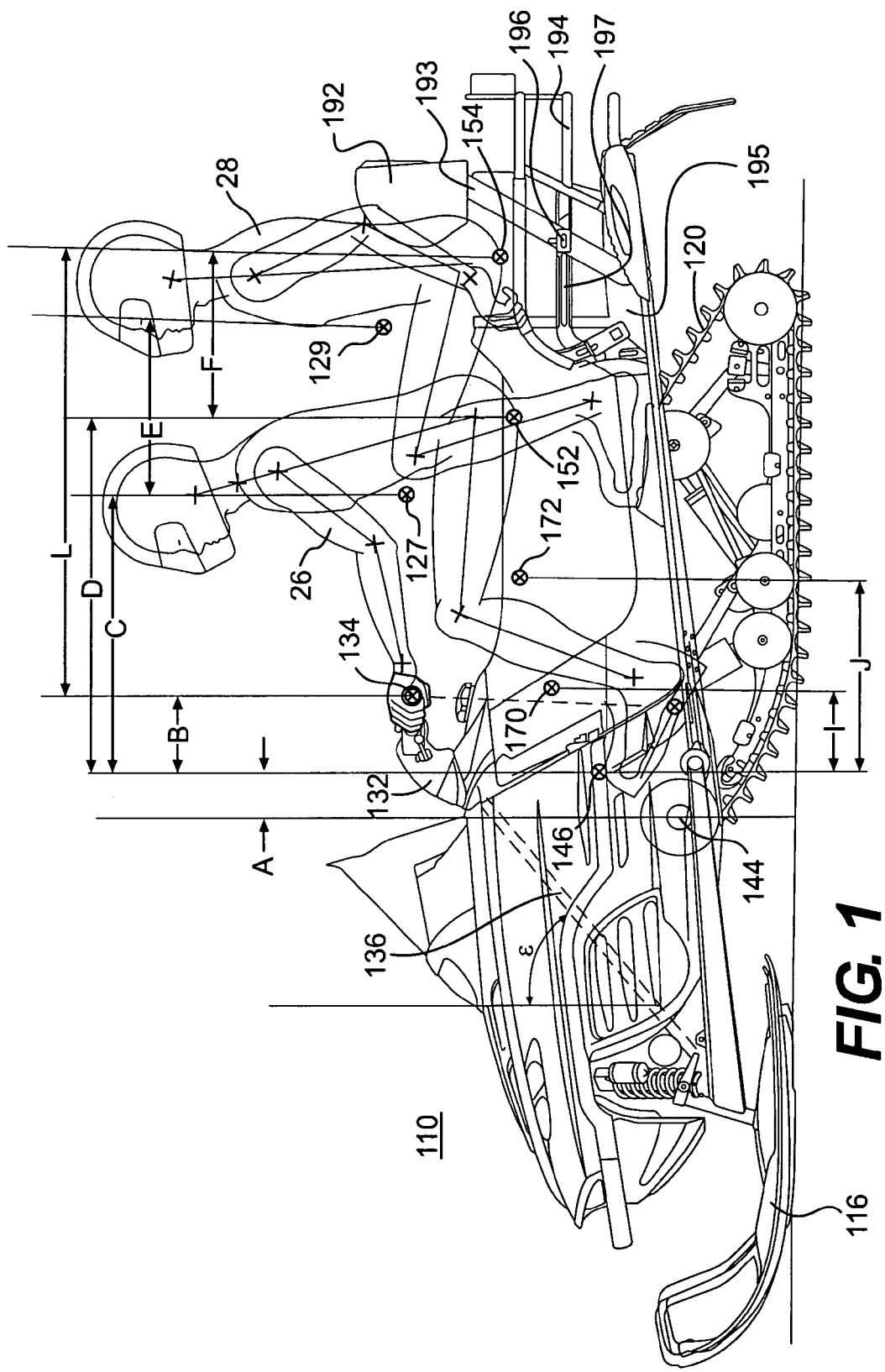
FIG. 1 is a side view illustration of a conventional snowmobile.

Throughout the description of the various embodiments of the present invention, reference will be made to various elements, the construction of which is readily known to those skilled in the art. Accordingly, an exhaustive description of each and every component is not provided. Components that are similar to components in other embodiments will be referenced by identical reference characters but with different prefix digits.

The inventors of the present invention realized that it is possible to improve the construction of a snowmobile to alter the positioning of the riders to considerably improve the handling and ride of the snowmobile. By shifting the steering device of the snowmobile forward, the centers of gravity of the riders are likewise shifted forward and closer to the center of gravity of the snowmobile. As a result, the riders experience significantly less jostling when the snowmobile encounters uneven terrain. Moreover, the driver is able to maintain better control over the snowmobile.

In addition, by moving the positioning of the first and second riders forward, the inventors of the present invention have been able to add a third seat for a third rider behind the second rider, while avoiding the prohibitively large forces that a third rider would have experienced on a conventional snowmobile.

To facilitate comparison of the present invention to a conventional snowmobile, several additional aspects of the conventional snowmobile 110 should be identified. As shown in FIG. 1, the steering shaft 136 operatively connects the steering device 132 to the skis 116. The steering device 132 has a steering position 134, which is defined in the same manner as in the below embodiments. The driver (first rider) 26 has a center of gravity 127, which is located slightly forward of his torso because his arms and legs extend forward of his body while riding the snowmobile 110, and sits in a seat position 152. Similarly, the first passenger (second rider) 28 has a center of gravity 129, and sits in a seat position 154. A combined center of gravity 170 of the snowmobile 110 and the first rider 26 is located behind the center of gravity 146 of the snowmobile 110 without riders. A combined center of gravity 172 of the snowmobile 110 and first and second riders 26, 28 is located farther behind the center of gravity 146 of the snowmobile 110 without any riders.

A backrest 192 is attached via left and right arms 193 (only the left being shown) to the tunnel 195 of the snowmobile 110. The left and right arms 193 are pivotally attached at lower ends to the tunnel 195. Backrest 192 is moveable with tunnel 195 such that the rider 28 may adjust the positioning of the backrest for his or her comfort. A locking mechanism 196, slidingly attached to arms 193 and cargo rack 194 holds the left and right arms in the desired position.

Figure 2:
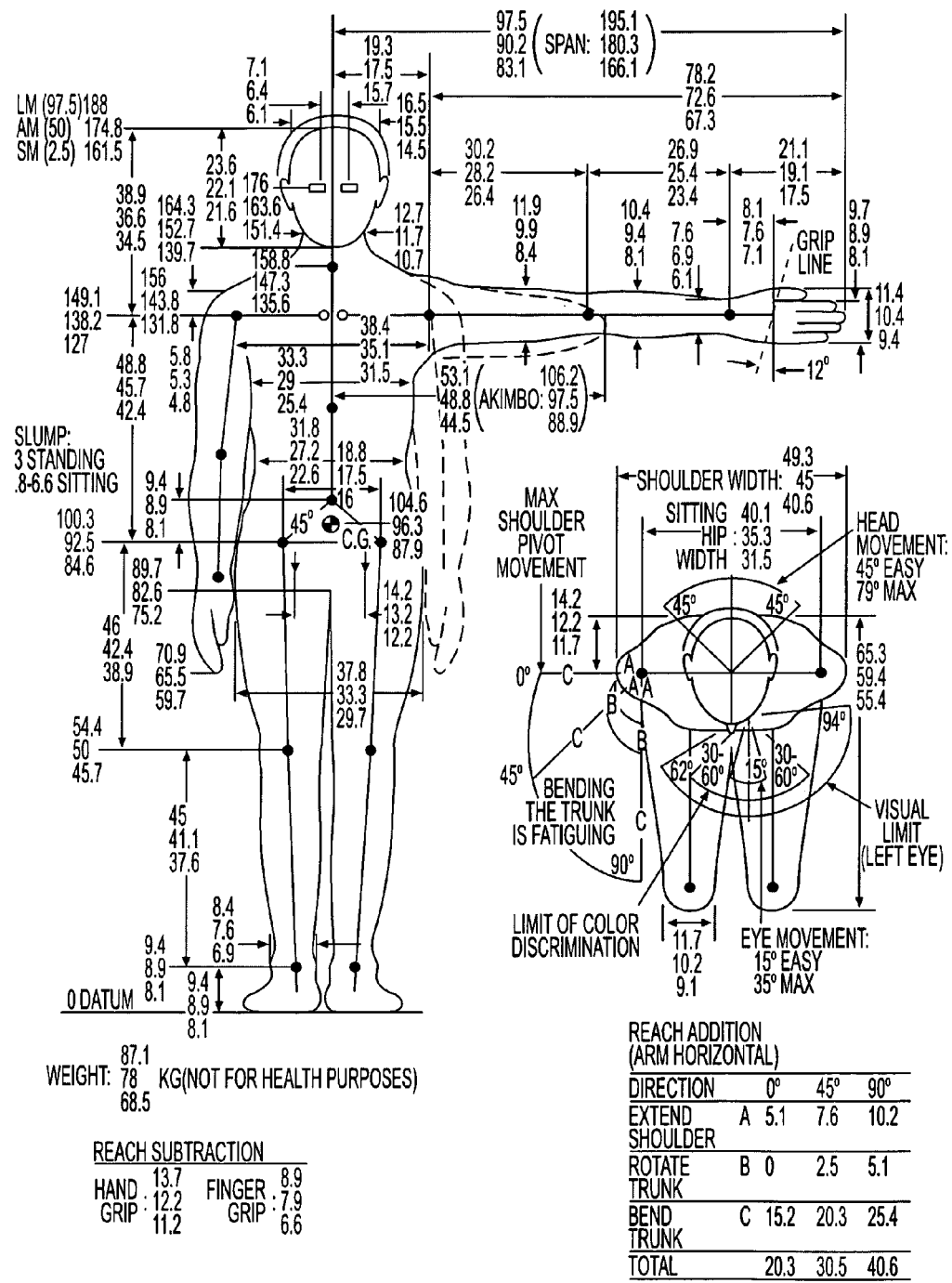
FIGS. 2 and 3 show the dimensions of a standard rider.
Figure 3:
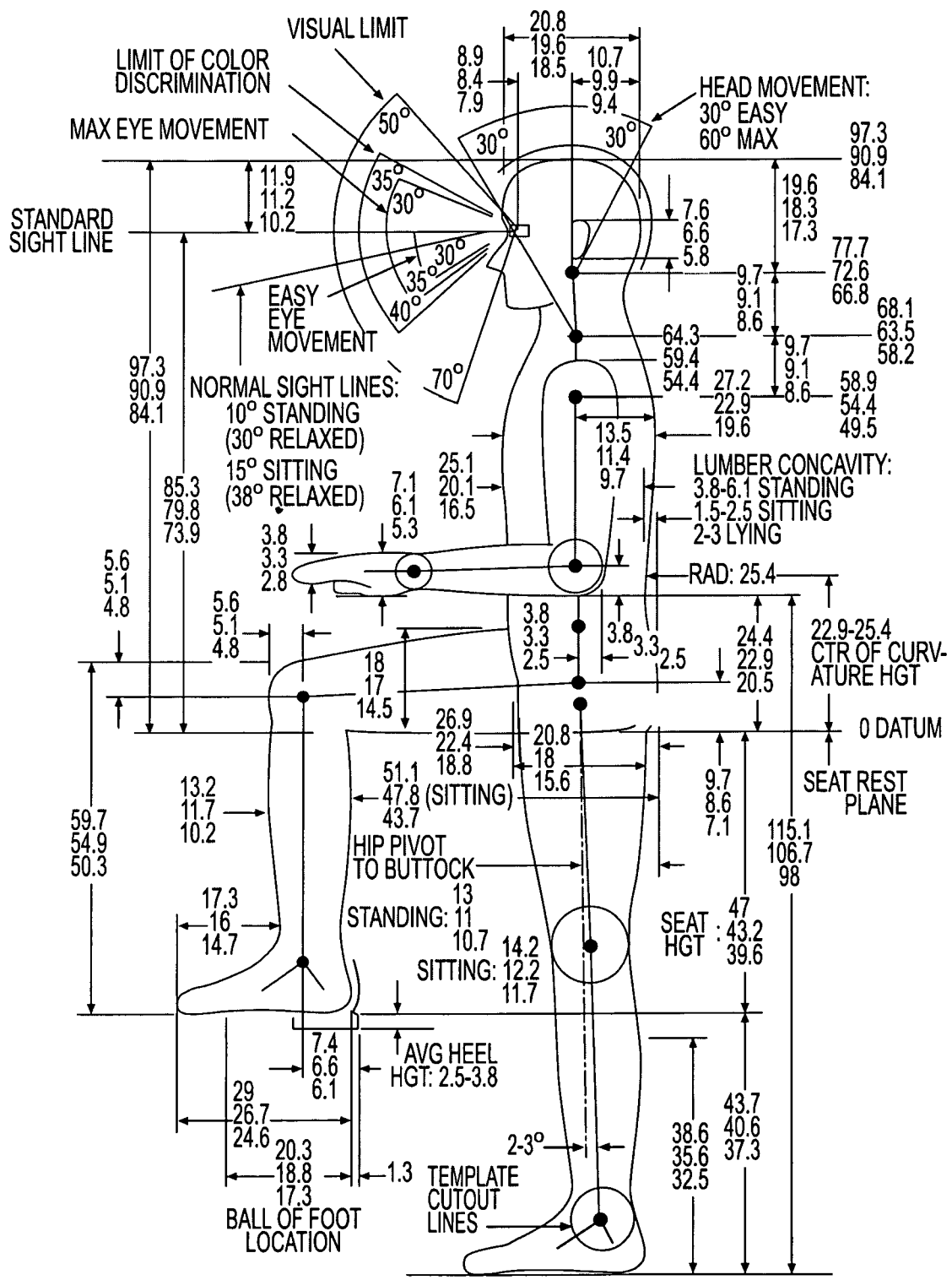

FIGS. 2 and 3 illustrate the various dimensions of a standard rider of the type depicted throughout the drawings. The standard rider is a $50^{th}$ percentile North-American adult male. All lengths in FIGS. 2 and 3 are in centimeters. The middle of each set of three dimensions represents the standard rider. The standard rider weighs 78 kgs. and has the body build illustrated in FIGS. 2 and 3. The dimensions of the standard rider are a "ruler" by which the dimensions of the various embodiments of the snowmobile of the present invention are measured. Riders 26, 28, 30 are standard riders.

FIGS. 4-8 illustrate a first embodiment of the present invention. Snowmobile 1100 is designed to accommodate up to three riders (a driver and first and second passengers). Accordingly, a three-person straddle-type seat assembly 1110 is mounted to a frame 1120 of the snowmobile 1100.

The snowmobile 1100 includes a forward end 1111 and a rearward end 1112, which are defined consistently with the forward travel direction of the vehicle. The snowmobile 1100 includes a chassis 1113 which normally includes a rear tunnel 1120, an engine cradle portion 1114 and a front suspension assembly portion 1118. An engine 1117 which is carried by the engine cradle portion 1114 of the chassis 1113. A ski and steering assembly (not indicated) is provided, in which two skis 1116 (only one is shown) are positioned at the forward end 1111 of the snowmobile 1100, and are attached to the front suspension assembly portion 1118 of the chassis 1113. The front suspension assembly 1118 includes ski legs 1119, supporting arms 1121 and ball joints (not shown) for operatively joining the respective ski legs 1119, supporting arms 1121 and a steering column 1136. The steering column 1136 at its upper end is attached to a steering device such as a handlebar 1180 which is positioned forward of a rider 26 and behind the engine 1117 to rotate the ski legs 1119 and thus the skis 1116, in order to steer the vehicle.

An endless drive track 1156 is positioned at the rear end 1112 of the snowmobile 1100 and is disposed under tunnel 1120, being connected operatively to the engine 1117 through a belt transmission system, (not shown). Thus, the endless drive-track 1156 is driven to run about a rear suspension assembly 1122 for propulsion of the snowmobile 1100.

At the front end 1111 of the snowmobile 1100, there are provided fairings 1123 that enclose the engine 1117 and the belt transmission system, thereby providing an external shell that not only protects the engine 1117 and the belt transmission system, but can also be decorated to make the snowmobile 1100 more aesthetically pleasing. Typically, the fairings 1123 include a hood 1124 and one or more side panels 1125 which are both openable to allow for access to the engine 1117 and the belt transmission system when this is required, for example for inspection or maintenance of the engine 1117 and/or the belt transmission system. A windshield 1131 may be connected to the fairings 1123 near the front end 1111 of the snowmobile 1100, or may be attached directly to the handlebar 1180. The windshield 1131 acts as a windscreen to lessen the force of the air on the rider while the snowmobile 1100 is moving.

Figure 4:
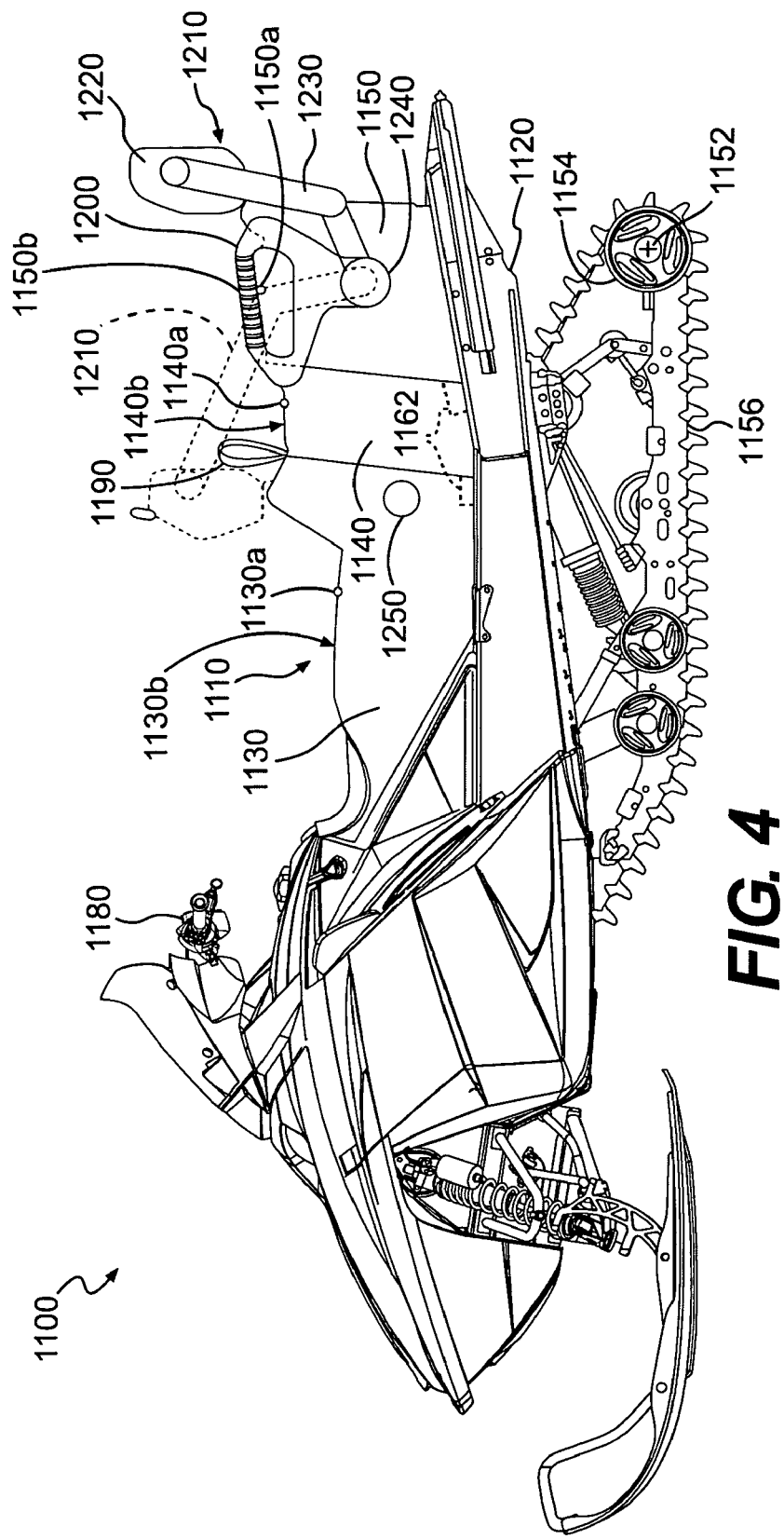
FIG. 4 is a side view of a three-person snowmobile according to a seventh embodiment of the present invention.
Figure 8:
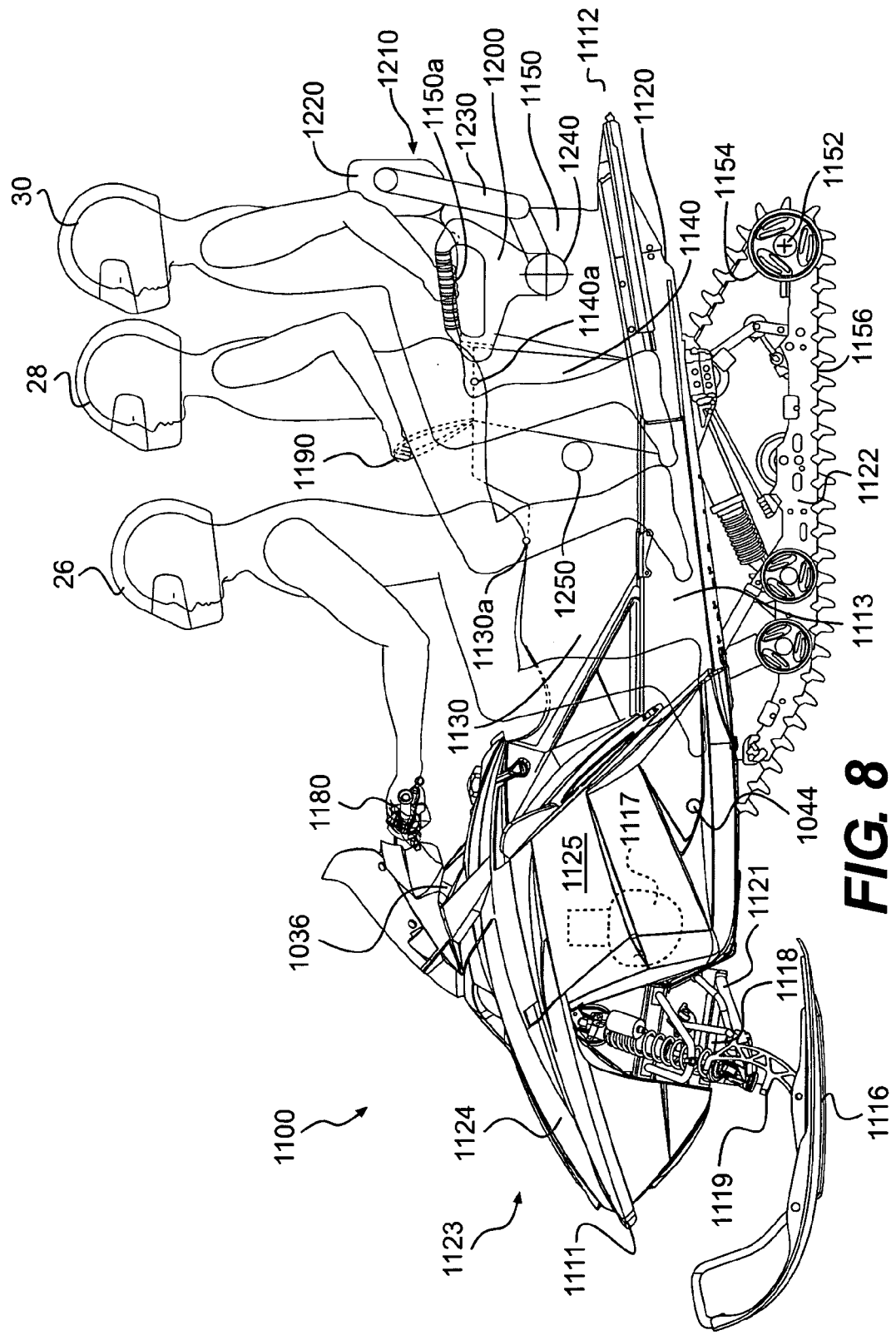
FIG. 8 is a side view of the snowmobile illustrated in FIG. 4 with three riders thereon.

FIGS. 4 and 8 illustrate a first configuration of the seat assembly 1110, which is specifically designed to accommodate 3 riders. The straddle type seat assembly 1110 comprises distinct first, second, and third seat portions 1130, 1140, 1150 for the driver, first passenger, and second passenger, respectively. The seat portions 1130, 1140, 1150 define seat positions 1130a, 1140a, 1150a, respectively for the driver and the two passengers.

The seat position 1150a of the second passenger is disposed forward of an axis 1152 of a rear idler wheel 1154 of an endless track 1156 of the snowmobile 1100. By placing the seat position 1150a forward of the rear idler wheel 1154, the skis of the snowmobile 1100 and the second passenger are disposed on the same side of the "see-saw" fulcrum created by the rear idler wheel 1154 so that the second passenger's weight does not lift the steering skis or impair the steerability of the snowmobile 1100. In conventional snowmobiles, on the other hand, if a third rider attempts to squeeze onto a snowmobile, his weight would be positioned behind the rear idler wheel and, disadvantageously, would tend to lift the skis from the ground or reduce the steering force applied by the skis.

Figure 4A:
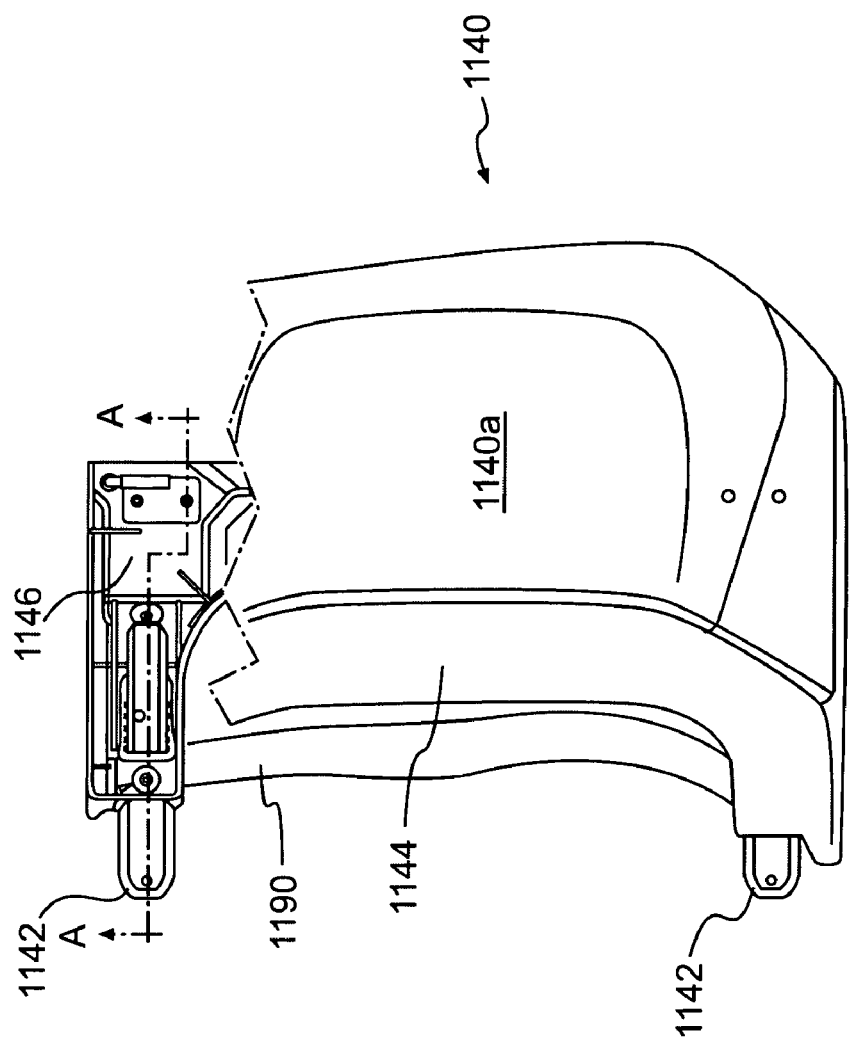
FIG. 4A is a top view of the second seat with a portion of the seat cut away to illustrate internal components.
Figure 4B:
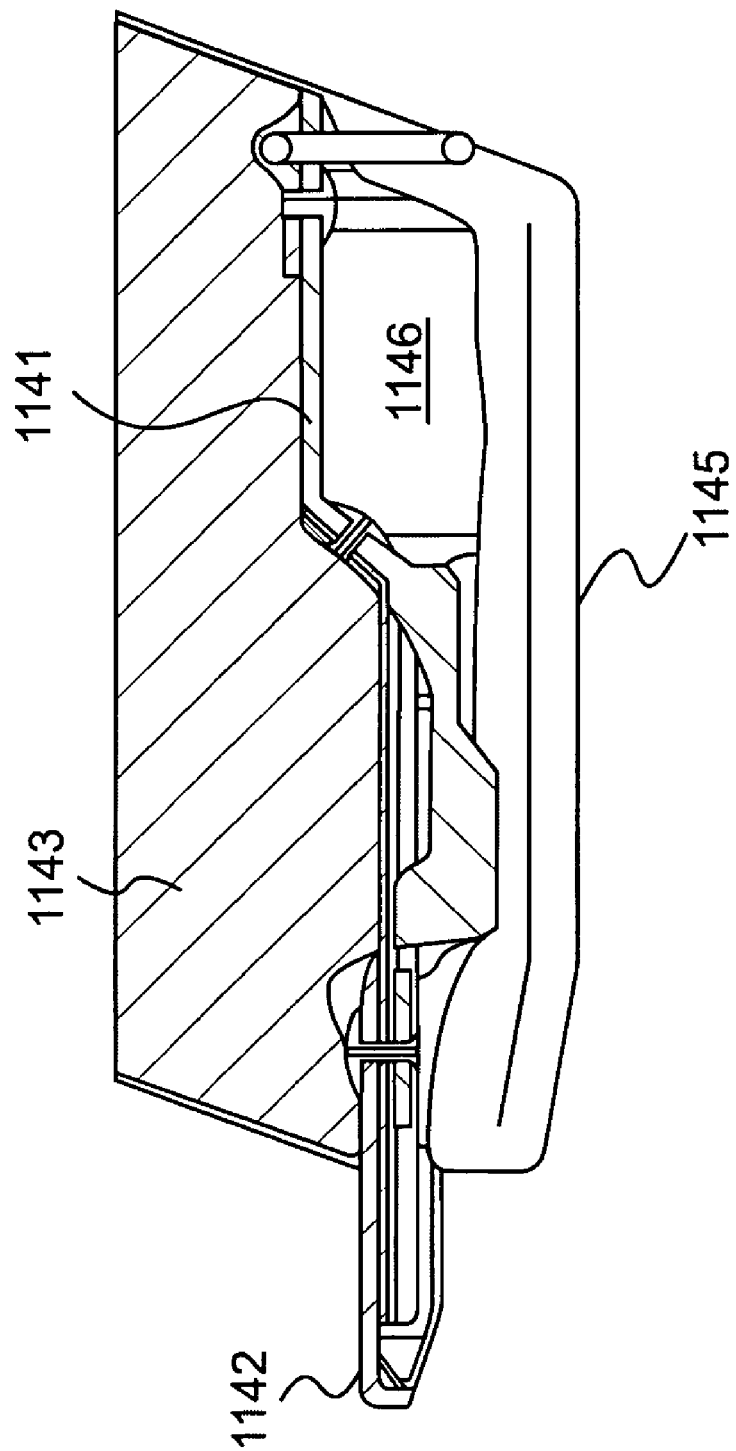
FIG. 4B is a cross-section of the second seat along A-A shown in FIG. 4A.

Second seat portion 1140 is shown in greater detail in FIGS. 4A and 4B. Seat portion 1140 comprises a base 1141, preferably made from plastic or light weight metal and a foam 1143 placed on top of the base 1141. The top portion of foam 1143 defines seat position 1140a where a rider will be seated. A flexible, preferably waterproof cover will cover the foam 1143 and attach to the base 1141 to hold the foam and base together as a single unit. Base 1141 further includes tongues 1142 extending forwardly from the front of the base 1141. Tongues 1142 are used to secure seat 1140 to the first seat portion 1130 as will be described in greater detail below. Base 1141 also includes cavities 1146 situated toward the rear of the base 1141. Cavities 1146 serve to accept tongues 1152 of seat 1150 shown in FIGS. 4C and 4D. In the preferred embodiment, two cavities are used to accept two tongues of the seat placed behind it, it will be appreciated that one or more than two tongues and cavities could be used.

Figure 4C:
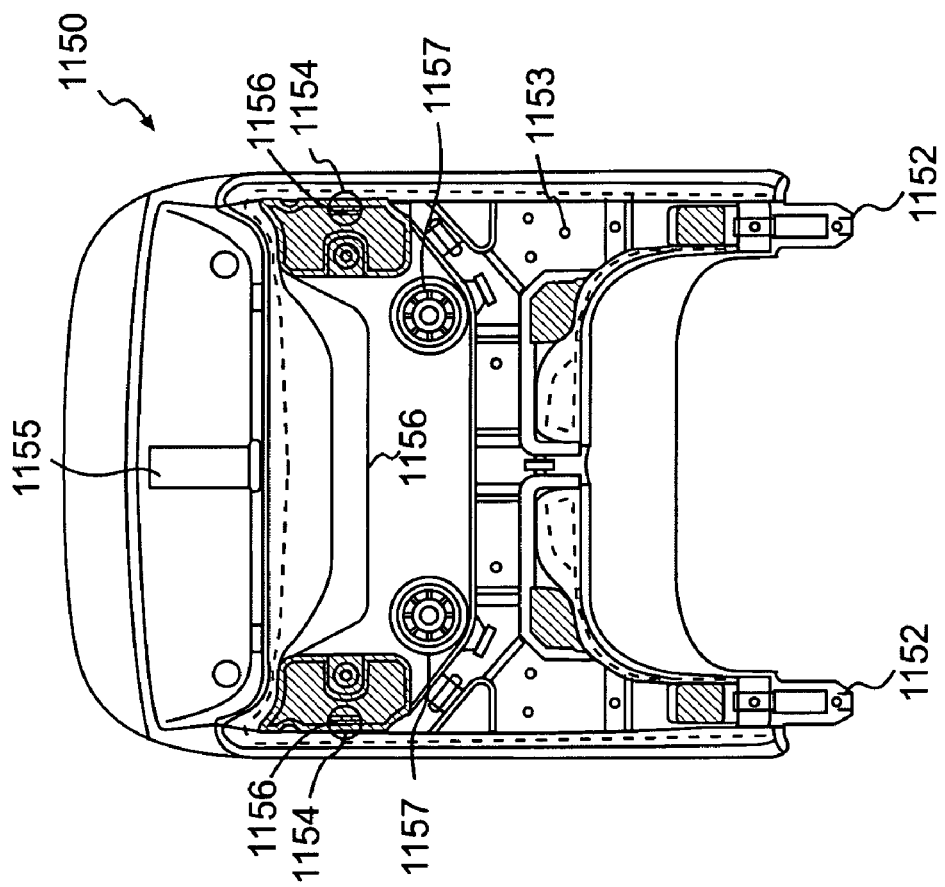
FIG. 4C is a bottom view of the third seat portion.
Figure 4D:
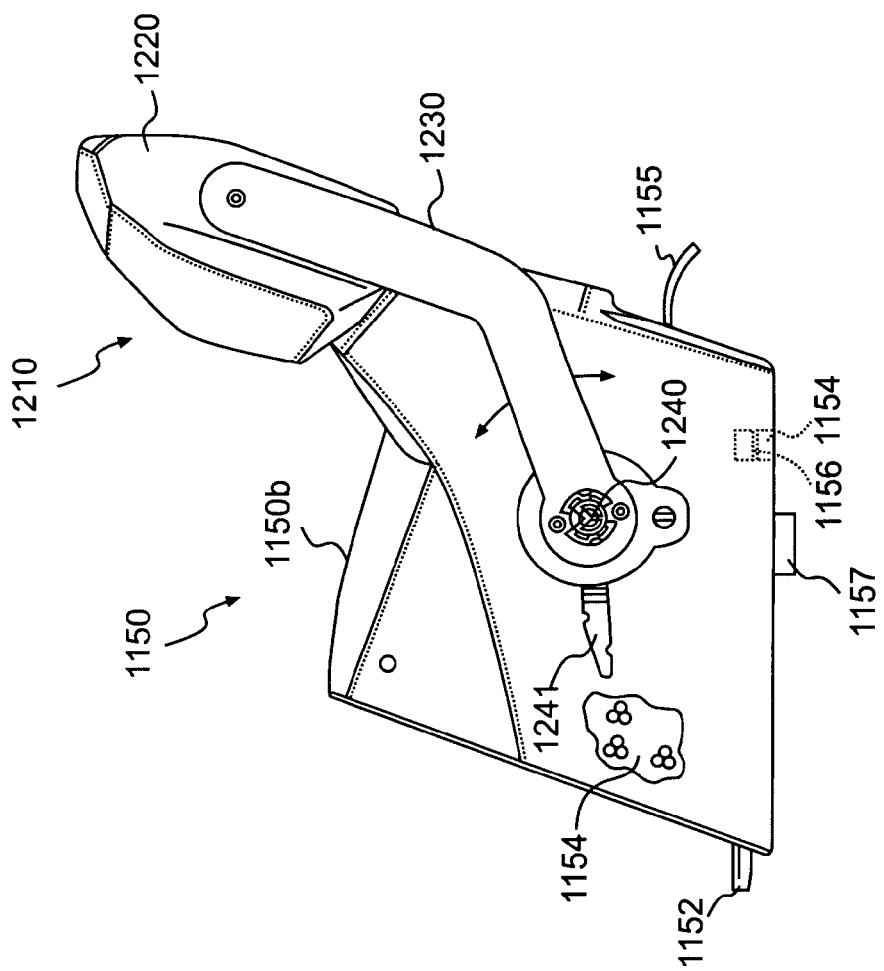
FIG. 4D is a side view of the third seat portion of FIG. 4D.
Figure 4E:
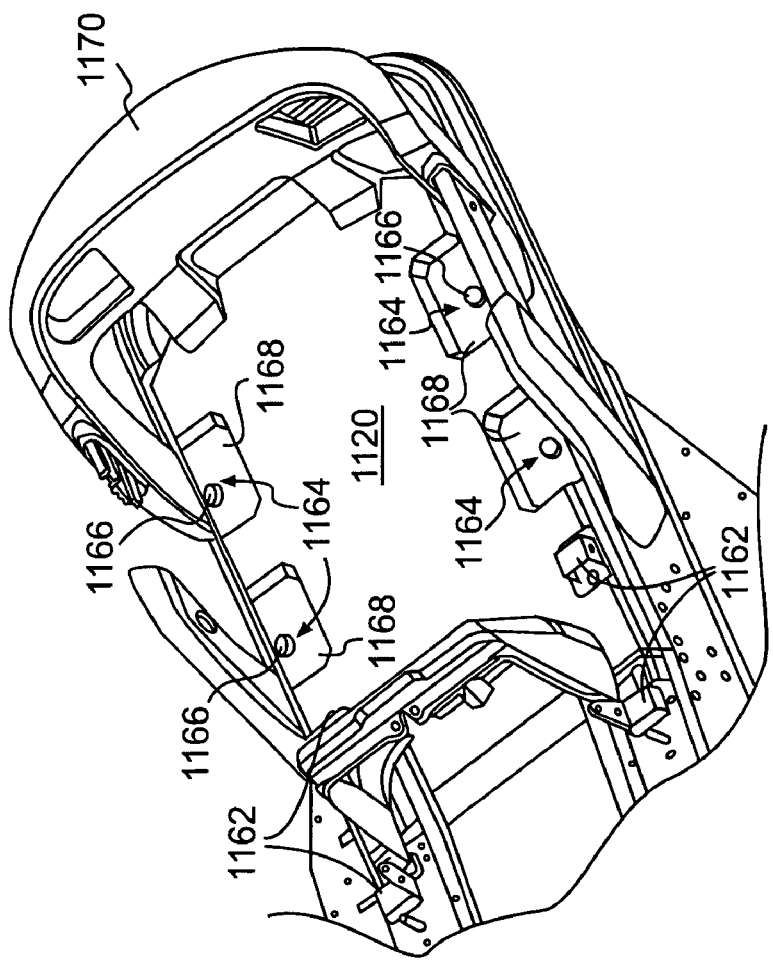
FIG. 4E is a top view of a portion of the rear of the tunnel including mounting pins.

Best seen in FIG. 4E the tunnel 1120 has two holders 1162, one on the right-hand side of the tunnel and one on the left-hand side of the tunnel, to accept tongues 1142 and/or 1152 of the second and third seat portions 1140 and/or 1150 respectively. The two forward-most holders 1162 are preferably situated on the tunnel 1120 such that they coincide with the rear bottom corners of the first seat portion 1130 and second seat portion 1140 best shown in FIG. 4. When the second seat portion 1140 is to be attached to the snowmobile 1100, the bottom surface 1145 of second seat portion 1140 is placed on top of frame/tunnel 1120 such that the tongues 1142 are aligned with the two forward-most holders 1162. The seat 1140 is then pushed forward until surface 1144 of the second seat portion 1140 contacts the first seat portion 1130. The bottom surface 1145 of the second seat portion 1140 further includes cavities 1146 which accept the rear-most holders 1162 and permit the second seat portion 1140 to lie flat onto the tunnel 1120. In order to prevent the second seat portion from moving rearward relative to the first seat portion, a third seat portion 1150 is attached to top of the tunnel 1120 behind the second seat portion 1140 as will be described in greater detail below.

Figure 5:
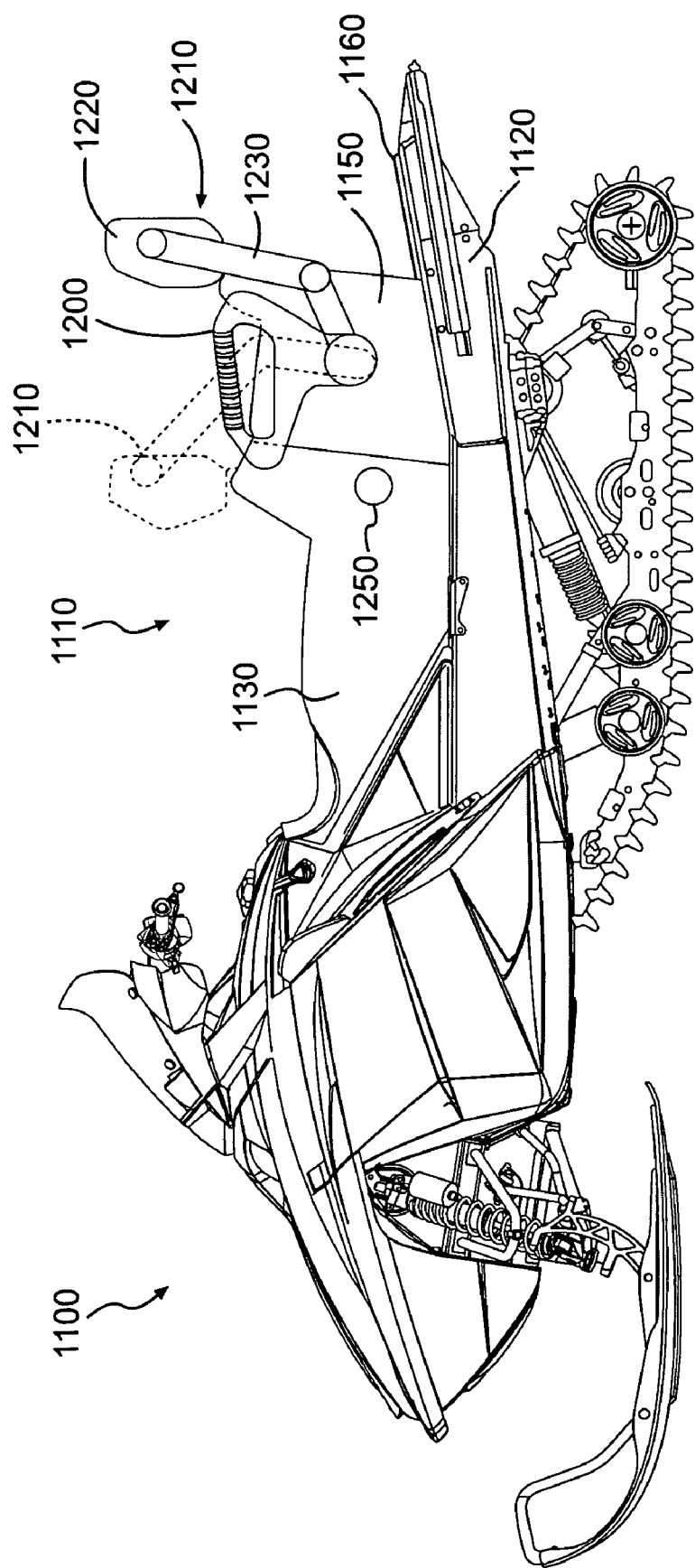
FIG. 5 is a side view of the snowmobile illustrated in FIG. 4 in a two-person seat configuration.

Also shown in FIG. 4E are pins 1164 which are used to attach the third seat portion 1150 to the tunnel 1120 in a manner described below. The preferred embodiment uses two laterally spaced pins to attach the seat in each of the two positions, i.e. when the third seat portion 1150 is placed directly behind the first seat portion 1130, the two forward-most pins 1164 are used, when the third seat portion 1150 is placed behind the second seat portion 1140, which is itself placed behind the first seat portion 1130, the two rear-most pins 1164 are used. It would be appreciated that one or more than two pins could be used to secure the seat portion to the tunnel. The pins 1164 have a circular shaft (not shown) with an enlarged head portion 1166. The pins 1164 are preferably placed in indentations 1168 within the tunnel 1120 such that the enlarged heads 1166 do not protrude beyond the upper surface of the tunnel and interfere with any cargo placed in that area when the seat portions are not being used. A cargo rack 1170 is also placed on the tunnel 1120 to prevent cargo from falling off the tunnel 1120. The wall 1170 could also be used to support additional accessories or the passenger hand grips 1200 such as is shown in FIG. 5.

FIGS. 4C and 4D illustrate further aspects of the third seat portion 1150. Third seat portion 1150 comprises a base 1153, preferably made of plastic or a lightweight metal, and foam 1154 placed above the base 1153. A flexible, preferably waterproof cover will cover the foam 1154 and attach to the base 1153 to hold the foam and base as a single unit. The top surface of foam 1154 defines the seating surface 1150b. As discussed above, third seat portion 1150 also includes two tongues 1152 extending forwardly from the base 1153. Base 1153 further includes two apertures 1154 toward the rear bottom corners of the base 1153 as can be seen in FIGS. 4C and 4D. Apertures 1154 are provided to accept mounting pins 1164 shown in FIG. 4D.

Base 1153 also includes a latch mechanism for holding and releasing the third seat portion 1150 to the tunnel 1120. The latch mechanism uses a strap 1155, extending from the rear of the seat 1150 and connected to a piece of wire 1156, which, when the seat is installed onto the tunnel 1120, engages the enlarged portions 1166 of the mounting pins 1164 preventing the seat from being pulled away from the tunnel 1120. Wire 1156 is shaped such that it passed through at least a portion of the aperture 1154. When strap 1155 is pulled, the wire is flexed away from the aperture 1154, disengaging the pins 1164 and allowing the seat to be removed from the tunnel.

It is to be understood, that, in order to install the third seat portion 1150 to the top of the tunnel 1120 behind the second seat portion 1140, or behind the first seat portion 1130, one would slightly tip the seat toward the front, insert the tongues 1152 into cavities 1162 and proceed to push the rear of the seat toward the tunnel until pins 1164 are inserted into apertures 1154 and wire 1156 has flexed and passed over the enlarged top portion 1166 of the pins 1164 securing the seat to the tunnel 1120. The second seat portion 1140, when in used, relies on its tongues 1142 inserted into the two forward-most cavities 1162 and the tight fit with between the first seat portion and the third seat portion to keep it in place. As would be appreciated by one skilled in the art, a similar attachment system including the pins and flexible wire explained for the third seat portion 1150 could be used to attach the second seat portion 1140 to the tunnel 1120 without deviating from the present invention.

In the preferred embodiment, the second seat portion 1140 can only be installed if the third seat portion 1150 has been removed from the tunnel 1120. It is contemplated that the second seat portion, without the tongues 1142, could be used and simply inserted between the first seat portion 1130 and the third seat portion 1150 (also without tongues 1152) and rely on a tight fit between the two seats to prevent the second seat portion 1140 from being inadvertently removed from the tunnel 1120.

Base 1153 of the third seat portion 1150 further includes rubber bumpers 1157. Bumpers 1157 make contact with the top surface of the tunnel 1120 when the third seat portion 1150 is attached to the tunnel 1120. Bumpers 1157 are sized such that they are compressed between the seat and the tunnel once the seat is installed onto the tunnel, thus pushing the seat vertically away form the tunnel creating constant contact between the wire 1156 and the enlarged portion 1166 of pins 1164, eliminating any small vertical movements between the seat and the tunnel when the rider is not seated on the seat. It would be understood that the force created by the bumpers 1157 would be insufficient to cause the third seat portion to be inadvertently forced away from the tunnel.

To facilitate comfortable seating of all three riders, a surface 1130*b* of a seat defined by the first seat portion 1130 is preferably disposed below a surface 1140*b* of a seat defined by the second seat portion 1140. The surface 1140*b* is preferably disposed below or at the same height as a surface 1150*b* of a seat of the third seat portion 1150.

FIG. 4D also shows backrest assembly 1210 mounted to the third seat portion 1150 through the mounting points 1240. Mounting points 1240 allow the backrest assembly 1210 to pivot with respect to the third seat portion 1150 in the direction of the arrows. A lever, 1241, when rotated counterclockwise, engages a release mechanism (not shown) which allows the spring to bias the backrest 1220 toward the front. When lever 1241 is rotated clockwise, the release mechanism prevents further movement of the backrest 1220 relative to the third seat portion 1150. This allows the passenger to adjust the positioning of the backrest 1220 to a comfortable position. Lever 1241 may also be spring biased to a position which prevents the backrest 1220 from any movement with respect to the third seat portion 1150.

FIG. 5 illustrates a second configuration of the seat assembly 1110, which is designed to accommodate 2 riders, (a driver and one passenger). As may be appreciated from the discussion that follows, the second configuration of the seat assembly 1110 presents a variation on the configuration depicted in FIG. 4.

So that these two configurations are possible, each seat portion 1130, 1140, 1150 is individually mounted to the frame 1120. The first seat portion 1130 is mounted to the frame 1120. The second seat portion 1140 is selectively detachable from the frame 1120. The third seat portion 1150 is movably attached to the frame 1120 for selective positioning in a rearward position (see FIG. 4) and a forward position (see FIG. 5). Accordingly, when the second seat portion 1140 is detached from the snowmobile 1100, the third seat portion 1150 may be selectively moved forward to abut against the first seat portion 1130. In this second seat assembly 1110 configuration, the driver is supported by the first seat portion 1130 and a first passenger is supported by the third seat portion 1150. For this configuration, a storage space 1160 is provided behind the third seat portion 1150 and above the frame 1120 in the space created by moving the third seat portion 1150 forward.

Figure 6:
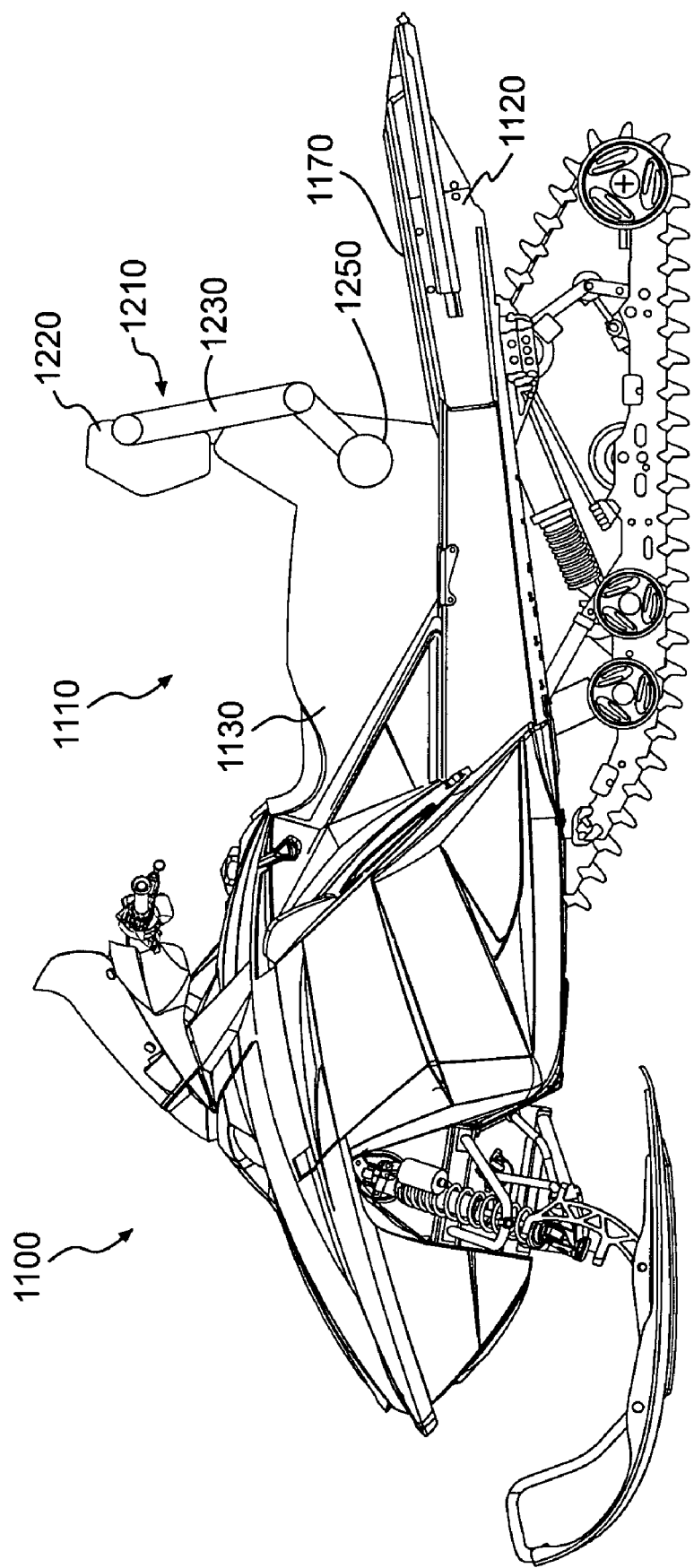
FIG. 6 is a side view of the snowmobile illustrated in FIG. 4; in a one-person seat configuration.

FIG. 6 illustrates a third seat assembly 1110 configuration, which is designed to accommodate one rider. In addition to being movably attached to the frame 1120, the third seat portion 1150 is also detachably mounted to the frame 1120. Accordingly, when both the second and third seat portions 1140, 1150 are detached, the seat assembly 1100 provides support for one rider via the first seat portion 1130. A large storage space 1170 is provided behind the first seat portion and above the frame 1120 in the space that is no longer occupied by the second and third seat portions 1140, 1150.

As illustrated in FIGS. 4 and 8, various hand holds are preferably provided on the seat assembly 1110 to help the riders secure themselves in their positions on the snowmobile 1100. The driver remains secure on the seat assembly 1110 because he holds the steering device 1180 (such as handlebars) with his/her hands.

The first passenger holds onto a looped strap 1190 that is mounted to the second seat portion 1140. When the first passenger rests on the second seat portion 1140, the looped strap 1190 is disposed between his/her legs and is positioned to enable the first passenger to hold onto the looped strap 1190 with his/her hands. In the illustrated embodiment, the looped strap 1190 comprises a looped piece of fabric webbing. However, various other types of hand holds could alternatively be provided for the first passenger. For example, flexible rubber or plastic handles could be mounted to the forward middle portion of the second seat portion 1140. Alternatively, grab handle(s) could be formed in the second seat portion 1140. Hand holds for the first passenger could alternatively be attached to or formed in a back end of the first seat portion 1130.

Since the looped strap 1190 is mounted on the second seat portion 1140, detachment of the second seat portion 1140 from the snowmobile 1100 also detaches the looped strap 1190 from the snowmobile 1100. Of course, in the alternative, the looped strap 1190 could be attached to the rear of the first seat portion 1130 without deviating from the scope of the present invention.

In the embodiment illustrated in FIG. 8, left and right grab handles 1200 (only the left grab handle is shown) mount to the left and right sides of the third seat portion 1150. The grab handles 1200 extend upwardly above the surface 1150*b* of the seat of the third seat portion 1150 to enable the second passenger to easily grab the handles 1200 with his/her hands without having to strain his/her arms. The grab handles preferably comprise blow-molded plastic or rubber that is relatively flexible. Such grab handles are preferably of the type described in U.S. patent application Ser. No. 10/361,682, filed Feb. 11, 2003, titled "QUICK RELEASE PASSENGER SEAT WITH FLEXIBLE GRAB HANDLE", which is incorporated by reference herein in its entirety. In the alternative, as would be appreciated by those skilled in the art, the grab handles 1200 may not be attached to the third seat portion 1150. Alternatively, a strap, such as the looped strap 1190, may be attached thereto.

Figure 7:
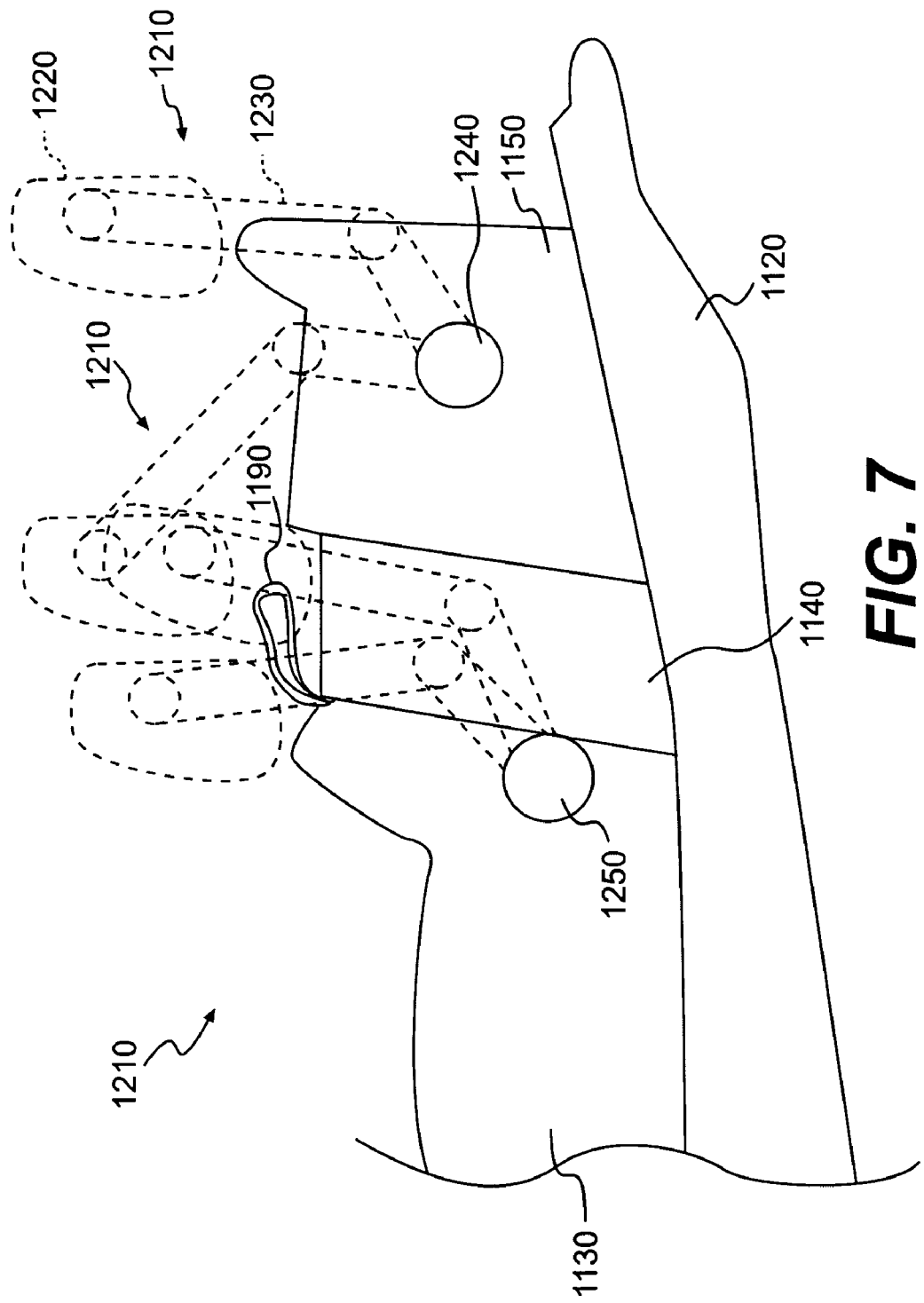
FIG. 7 is a partial side view of the snowmobile illustrated in FIG. 4.

As illustrated in FIGS. 4, 4D, and 5 a backrest assembly 1210 mounts to the third seat portion 1150. The backrest assembly 1210 includes a cushioned backrest 1220 connected to an adjustable backrest mount 1230. The third seat portion 1150 includes backrest mounting points 1240 on its left and right sides. The backrest mount 1230 has left and right arms that extend downwardly from the cushioned backrest 1220 and are constructed and arranged to adjustably and detachably mount to the backrest mounting points 1240 of the third seat portion 1150. As illustrated in FIG. 7, the backrest mount 1230 selectively pivotally connects to the mounting points 1240 to enable the position of the backrest 1220 to be adjusted. The backrest mount 1230 may include one or more internal backrest 1220 adjustment mechanisms, e.g., pivotal connections, telescopic connections, etc. The backrest assembly 1210 can therefore be adjusted for use by the first or second passenger.

While only the extreme positions of the backrest assembly 1210 are illustrated, the backrest assembly 1210 is preferably selectively positionable in a variety of intermediate and more extreme positions. For example, as illustrated in dotted lines in FIG. 4, the backrest assembly 1210 may be attached to the third seat portion 1150 and pivoted forward enough that the driver may use the backrest 1220 for back support. Similarly, as illustrated in dotted lines in FIG. 5, when the second seat portion 1140 is removed, the backrest assembly 1210 may also be adjusted to provide back support for the driver sitting on the first seat portion 1130.

As illustrated in FIGS. 4, 6, and 7, the first seat portion 1130 also has left and right backrest mounting points 1250. As illustrated in FIG. 6, when the third seat portion 1150 is not used, the backrest assembly 1210 may be detached from the mounting points 1240 and attached to the mounting points 1250 so that the back rest 1220 may be used by the driver. As illustrated in FIG. 7, when attached to the mounting points 1250, the backrest assembly 1210 may also be pivoted rearwardly enough to provide back support to a first passenger. Also illustrated in FIG. 7, backrest assembly 1250 selectively pivotally connects to the backrest mounting points 1260 on the second seat portion 1140.

Although the second and third seat portions 1140, 1150 in this embodiment are independently detachable from the frame, various other seat assembly configurations are within the scope of the present invention. For example, all three seat portions 1130, 1140, 1150 could be integrally formed or permanently attached to each other. Such a combination of seat portions 1130, 1140, 1150 could be permanently attached to the frame or removably attached to the frame. Alternatively, the first and second seat portions 1130, 1140 could be integrally formed with each other such that just the third seat portion 1150 would be detachable.

Figure 9:
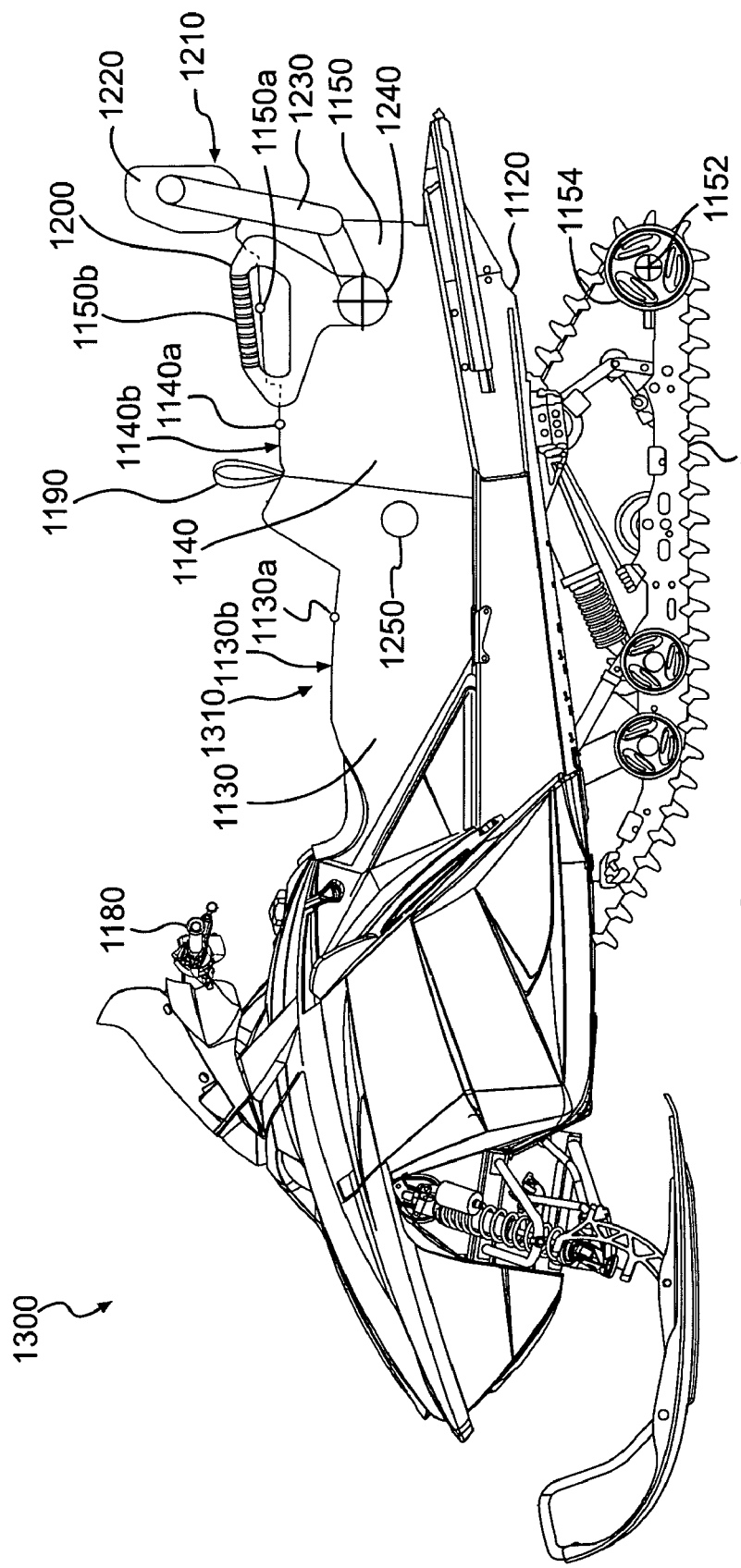
FIG. 9 is a side view of a three-person snowmobile according to an eighth embodiment of the present invention.

FIG. 9 illustrates yet another alternative embodiment of a snowmobile according to the present invention. The snowmobile 1300 is identical to the snowmobile 1100 illustrated in FIG. 4 except for an alternative seat assembly 1310. The seat assembly 1310 is identical to the seat assembly 1110 illustrated in FIG. 4 except that the second and third seat portions 1140, 1150 are integrally formed with (or otherwise permanently attached to) each other. The second and third seat portions 1140, 1150 can therefore be simultaneously detached from frame 1120 to create a storage space behind the first seat portion 1130. To use the seat assembly 1310 in a two rider configuration, the combined second and third seat portions 1140, 1150 are removed and a separate additional third seat portion 1150 is attached to the frame 1120 behind the first seat portion (see FIG. 5).

Figure 10:
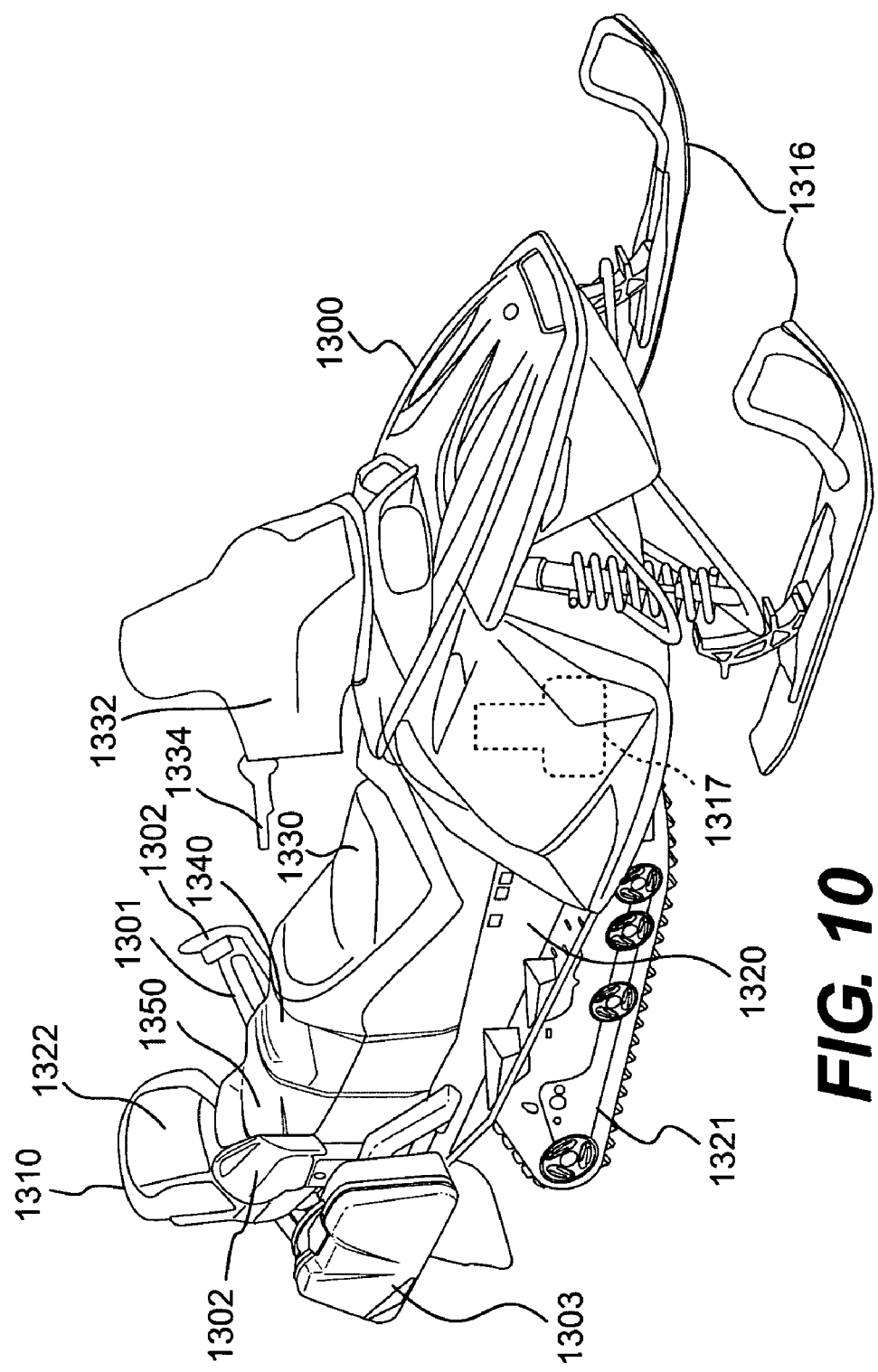
FIG. 10 is the commercial embodiment of the snowmobile of the present invention.

FIG. 10 shows a commercial embodiment of the present invention. Snowmobile 1300 is very similar to snowmobile 1100 shown in FIG. 5. Snowmobile 1300 has a frame 1320, an engine 1317 disposed on the frame 1320, a drive track 1321 disposed below the frame 1320 and operatively connected to the engine 1317. A straddle-type seat assembly 1310 is disposed on the frame 1320 rearward of the engine 1317 and two front skis 1316 are disposed forward of the engine 1317. Handlebars 1332 are operatively connect to the two front skis 1316 for steering the snowmobile 1300.

The straddle-type seat assembly 1310 is very similar to that of seat assembly 1110 shown in FIGS. 4-9 in that it comprises a first seat portion 1330, a second seat portion 1340 and a third seat portion 1350. Seat assembly 1310 also includes a back rest 1320 pivotally connected to the third seat portion 1350. Backrest 1322 pivotally connects to the third seat portion 1350 in the same manner as described above with respect to backrest 1220 and third seat portion 1150. Backrest 1322 is spring biased (not shown) toward the front of the seat as described above with respect to backrest 1220. As also shown in FIG. 10, handgrips 1301 and wind deflectors 1302 are provided on left and right sides of the third seat portion 1350. Cargo boxes 1303 may also be attached to the right and left sides of the third seat portion 1350 to provide extra storage space when travelling with all three seat portions.

Figure 11:
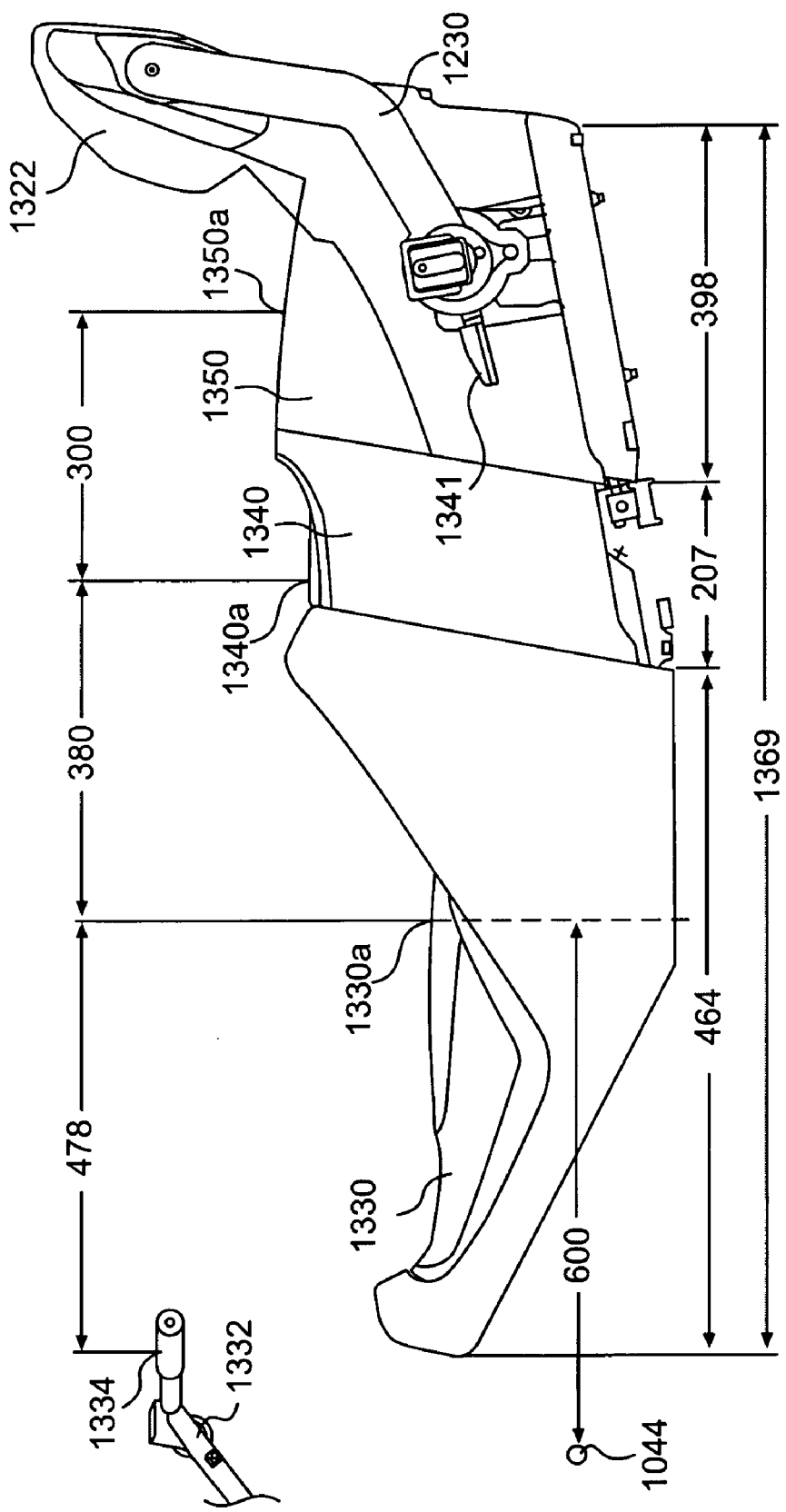
FIG. 11 is a side view of the seat shown in FIG. 10 showing the dimensions of the various seat portions.

FIG. 11 shows the preferred dimensions of the first, second and third seat portions 1330, 1340, and 1350 respectively. First seat portion 1330 is approximately 764 mm+/−50 mm in length. The second seat portion is approximately 207 mm+/−50 mm in length and the third seat portion is approximately 398 mm in length. The first seating portion has a first seating position 1330a, which is approximately 478 mm+/−50 mm from the steering position 1334. The second seat portion has a second seating position 1340a which is approximately 380 mm+/−50 mm behind the first seating position 1330a and the third seat portion 1350 has a third seat position 1350a which is approximately 300 mm+/−50 mm behind the second seating position 1340a. The total length of the seat assembly 1310 comprising first, second and third seat portions 1330, 1340, and 1350 is 1369 mm+/−150 mm.

While the invention has been described with reference to the various exemplary embodiments outlined above, it will be understood by those skilled in the art that various changes may be made and equivalents may be substituted for elements thereof without departing from the spirit and scope of the present invention. In addition, many modifications may be made to adapt a particular situation, component, or material to the teachings of the present invention without departing from its teachings as claimed.

What is claimed is:

1. A snowmobile comprising:
a frame comprising a tunnel;
an engine disposed on the frame;
a drive track disposed below the frame and operatively connected to the engine for propulsion of the snowmobile;
a straddle seat assembly attached to the tunnel rearward of the engine, the straddle seat assembly comprising a first seat portion for a driver, a second seat portion for a first passenger, a backrest mounted to the seat assembly, the backrest movable between a first position and a second position;
two skis disposed on the frame; and
a steering device disposed on the frame forward of the seat assembly and operatively connected to the two skis for steering the snowmobile.

2. The snowmobile of claim 1, wherein, when in the first position, the backrest provides support for the driver, and when in the second position, the backrest provides support for the first passenger.

3. The snowmobile of claim 2, wherein the backrest is pivotably mounted to the seat assembly and pivots between the first position and the second position.

4. The snowmobile of claim 2, wherein the seat assembly further comprises a plurality of backrest mounting points, and the backrest is selectively releasably attachable to at least one of the backrest mounting points.

5. The snowmobile of claim 4, wherein at least one backrest mounting point is associated with the first seat position and at least one backrest mounting point is associated with the second seat position.

6. The snowmobile of claim 1, wherein the seat assembly further comprises a third seat portion for a second passenger.

7. The snowmobile of claim 6, wherein the first seat portion, the second seat portion, and the third seat portion are each separately removable from the snowmobile.

8. The snowmobile of claim 1, wherein, when in the first position, the backrest provides support for the first passenger, and when in the second position, the backrest provides support for the second passenger.

9. The snowmobile of claim 8, wherein the backrest is pivotably mounted to the seat assembly and pivots between the first position and the second position.

10. The snowmobile of claim 8, wherein the seat assembly further comprises a plurality of backrest mounting points, and the backrest is selectively releasably attachable to at least one of the backrest mounting points.

11. The snowmobile of claim 10, wherein at least one backrest mounting point is associated with the second seat position and at least one backrest mounting point is associated with the third seat position.

12. A snowmobile comprising:

a frame;

an engine disposed on the frame;

a drive track disposed below the frame and operatively connected to the engine for propulsion of the snowmobile;

a straddle seat assembly attached to the frame rearward of the engine, the straddle seat assembly comprising a first seat portion for a driver, a second seat portion for a first passenger, a third seat portion for a second passenger, a backrest mounted to the seat assembly, the backrest being movable between a first position, a second position and a third position;

two skis disposed on the frame; and a steering device disposed on the frame forward of the seat assembly and operatively connected to the two skis for steering the snowmobile.

13. The snowmobile of claim 12, wherein the frame comprises a tunnel and the seat assembly is attached to the tunnel.

14. The snowmobile of claim 13, wherein, when in the first position, the backrest provides support for the first driver, when in the second position, the backrest provides support for the first passenger, and when in the third position, the backrest provides support for the second passenger.

15. The snowmobile of claim 14, wherein the backrest is pivotably mounted to the seat assembly and pivots between the first position, the second position, and the third position.

16. The snowmobile of claim 14, wherein the seat assembly further comprises a plurality of backrest mounting points, and the backrest is selectively releasably attachable to at least one of the backrest mounting points.

17. The snowmobile of claim 16, wherein at least one backrest mounting point is associated with the first seat position, at least one backrest mounting point is associated with the second seat position, and at least one backrest mounting point is associated with the third seat position.

18. A snowmobile comprising:

a frame;

an engine disposed on the frame;

a drive track disposed below the frame and operatively connected to the engine for propulsion of the snowmobile;

a straddle seat assembly attached to the frame rearward of the engine, the straddle seat assembly comprising a first seat portion for a driver, a second seat portion for a first passenger, a backrest mounted to the seat assembly, the backrest movable between a first position and a second position;

two skis disposed on the frame; and a steering device disposed on the frame forward of the seat assembly and operatively connected to the two skis for steering the snowmobile, wherein the first seat portion and the second seat portion are separately removable from the snowmobile.

* * * * *

UNITED STATES PATENT AND TRADEMARK OFFICE
CERTIFICATE OF CORRECTION

PATENT NO.         : 7,490,686 B2                                   Page 1 of 1
APPLICATION NO. : 11/212753
DATED              : February 17, 2009
INVENTOR(S)      : Yvon Bedard and Andre Gilbert It is certified that error appears in the above-identified patent and that said Letters Patent is hereby corrected as shown below:

Column 1, Line 7 & 8

Line 7, replace "Ser. No. 10/851,476" with -- Ser. No. 10/851,473 --.
    Line 8, replace "the '476" with -- the '473 --.

Signed and Sealed this

Seventh Day of April, 2009

JOHN DOLL
*Acting Director of the United States Patent and Trademark Office*